United States Patent
Yamada

(10) Patent No.: US 9,865,070 B2
(45) Date of Patent: Jan. 9, 2018

(54) PANORAMIC STITCHED IMAGE MEMORY TEXTURE WRITING

(71) Applicant: JVC KENWOOD Corporation, Yokohama-shi, Kanagawa (JP)

(72) Inventor: Kunio Yamada, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 346 days.

(21) Appl. No.: 14/663,961

(22) Filed: Mar. 20, 2015

(65) Prior Publication Data
US 2015/0269761 A1   Sep. 24, 2015

(30) Foreign Application Priority Data
Mar. 24, 2014 (JP) .................. 2014-060476

(51) Int. Cl.
| H04N 7/00 | (2011.01) |
| G06T 11/60 | (2006.01) |
| H04N 5/232 | (2006.01) |
| G06T 3/40 | (2006.01) |
| H04N 5/14 | (2006.01) |

(52) U.S. Cl.
CPC .......... G06T 11/60 (2013.01); G06T 3/4038 (2013.01); H04N 5/23238 (2013.01); H04N 5/144 (2013.01)

(58) Field of Classification Search
CPC ... G06T 3/4038; G06T 11/60; H04N 5/23238; H04N 5/144
See application file for complete search history.

(56) References Cited

U.S. PATENT DOCUMENTS

| 2007/0206945 A1* | 9/2007 | DeLorme ............... G03B 41/00 396/332 |
| 2007/0223909 A1 | 9/2007 | Tanaka |
| 2011/0242274 A1 | 10/2011 | Yamaji |

(Continued)

FOREIGN PATENT DOCUMENTS

| JP | 2007-266667 A | 10/2007 |
| JP | 2011-217065 A | 10/2011 |

(Continued)

Primary Examiner — Sath V Perungavoor
Assistant Examiner — Peet Dhillon
(74) Attorney, Agent, or Firm — Procopio, Cory, Hargreaves & Savitch LLP

(57) ABSTRACT

Provided are an image processing apparatus, a pixel processing method, a program, and a camera which are capable of appropriately generating a joined image. An image processing apparatus according to an exemplary embodiment generates a joined image by joining a plurality of textures based on a plurality of images. The image processing apparatus includes: a motion vector derivation unit that derives a motion between images of the plurality of images; a frame memory in which a joined image frame is set and the plurality of textures that form the joined image are written; and a texture writing unit that writes the plurality of textures into the frame memory based on the motion between the images. The texture writing unit writes a first texture among the plurality of textures into an area that is not in contact with an edge of the joined image frame.

5 Claims, 13 Drawing Sheets

(56) References Cited

U.S. PATENT DOCUMENTS

| | | | |
|---|---|---|---|
| 2012/0039509 A1* | 2/2012 | Fujioka | G06K 9/20 |
| | | | 382/103 |
| 2013/0038680 A1* | 2/2013 | Mashiah | H04N 5/23238 |
| | | | 348/36 |
| 2013/0044108 A1* | 2/2013 | Tanaka | G06T 15/04 |
| | | | 345/419 |
| 2013/0093840 A1 | 4/2013 | Ichikawa et al. | |

FOREIGN PATENT DOCUMENTS

| | | |
|---|---|---|
| JP | 2012-165405 A | 8/2012 |
| JP | 2013-90122 A | 5/2013 |

* cited by examiner

PANORAMIC STITCHED IMAGE MEMORY TEXTURE WRITING

INCORPORATION BY REFERENCE

This application is based upon and claims the benefit of priority from Japanese patent application No. 2014-60476, filed on Mar. 24, 2014, the disclosure of which is incorporated herein in its entirety by reference.

BACKGROUND OF THE INVENTION

1. Field of the Invention

The present invention relates to an image processing apparatus, an image processing method, a program, and a camera.

2. Description of Related Art

In recent years, a technique for creating a still image panorama by photographing a moving image while manually moving a camera so as to cover a large subject has been put into practical use. In this technique, a panoramic image is generated by joining the frame images constituting the moving image. A technique for creating a panoramic still image is generalized in the form of, for example, an additional function of a digital camera. This technique is based on a method in which a motion vector is derived during shooting with a panning technique and an area for a seam between frame images to be stitched together is controlled based on the motion vector.

There is also a technique for forming a large image by connecting a plurality of still images or moving image sequences (Japanese Unexamined Patent Application Publication No. 2007-266667). This technique is generally and widely known as panorama, photomosaicing, and the like. Especially since the time that use of digital cameras became widespread, the use of software for automatically or semi-automatically performing such processing has become widespread. A panoramic still image is basically created based on a linear camera trajectory. However, in principle, it is possible to join moving images captured along a free two-dimensional camera trajectory.

SUMMARY OF THE INVENTION

A first exemplary aspect of the present invention is an image processing apparatus that generates a joined image by joining a plurality of textures based on a plurality of images, the image processing apparatus including: a derivation unit that derives a motion between images of the plurality of images; a frame memory in which a joined image frame is set and the plurality of textures that form the joined image are written; and a texture writing unit that writes the plurality of textures into the frame memory based on the motion between the images. The texture writing unit writes a first texture among the plurality of textures into an area that is not in contact with an edge of the joined image frame.

A second exemplary aspect of the present invention is an image processing method that generates a joined image by joining a plurality of textures based on a plurality of images, the image processing method including: deriving a motion between images of the plurality of images; setting a joined image frame in a frame memory into which the plurality of textures that form the joined image are written; and writing, based on the motion between the images, the plurality of textures into the frame memory into which the textures that form the joined image are written. In the writing of the textures, a first texture among the plurality of textures is written into an area that is not in contact with an edge of the joined image frame.

A third exemplary aspect of the present invention is a non-transitory computer readable medium storing a program for causing a computer to execute image processing that generates a joined image by joining a plurality of textures based on a plurality of images, the image processing including: deriving a motion between images of the plurality of images; setting a joined image frame in a frame memory into which the plurality of textures that form the joined image are written; and writing, based on the motion between the images, the plurality of textures into the frame memory into which the textures that form the joined image are written. In the writing of the textures, a first texture among the plurality of textures is written into an area that is not in contact with an edge of the joined image frame.

DESCRIPTION OF THE EXEMPLARY EMBODIMENTS

Figure 1:
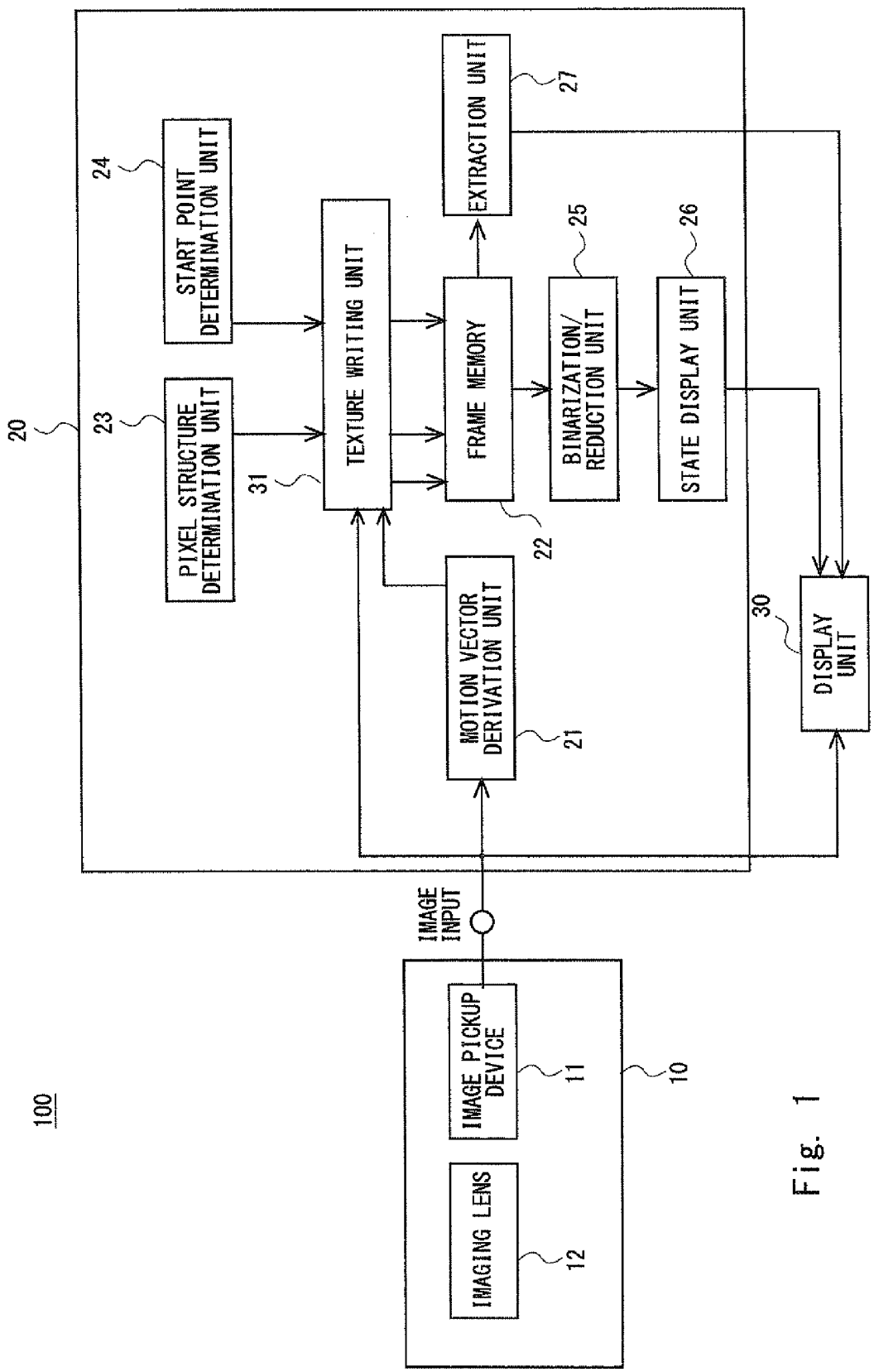
FIG. 1 is a block diagram showing a configuration of a camera according to a first exemplary embodiment.

The size of a frame memory used for image processing as mentioned above is limited. In other words, when the frames of moving images are joined together, the frame memory into which textures of each frame are written has a limited size. Accordingly, if the image pickup direction is changed to a large extent by a user, the textures may run off the edge of the frame memory. If the textures run off the edge of the frame memory, no more textures can be written into the frame memory, which makes it difficult to generate a desired joined image.

The present invention has been made in view of the above-mentioned circumstances, and an object of the present invention is to provide an image processing apparatus, an image processing method, a program, and a camera which are capable of generating a joined image based on images captured along a trajectory with a high degree of freedom.

An image processing apparatus according to an exemplary embodiment of the present invention is incorporated in, for example, a camera for taking moving images. When a user who uses the camera selects a panoramic still image mode, a panoramic still image is generated based on moving images.

The image processing apparatus generates a joined image by joining a plurality of images captured by changing an image pickup direction. For example, the user performs a pan operation to change the image pickup direction of the camera to the horizontal direction (right-left direction). Specifically, the angle of view of the camera is changed when the camera is moved during the obtainment of the moving images which are a set of still images captured continuously in terms of time. Textures obtained from each frame (still image) of the moving images thus obtained are joined together to thereby generate a joined image. For example, one joined image can be generated by overwriting a frame memory with the textures. Each texture may be a frame itself, or a partial area of the frame.

The image pickup direction may be changed not only to the horizontal direction, but also to the vertical direction (up-down direction).

In this manner, the image processing apparatus generates a joined image by using the moving images that are captured by the user while manually moving the camera freely in a two-dimensional manner. The joined image has a pixel size larger than the pixel size of the images captured by the image pickup device.

A first feature of the image processing apparatus according to an exemplary embodiment of the present invention is to determine a writing start point on the frame memory into which the joined image is written. On the frame memory including a limited number of pixels in the perpendicular direction and the horizontal direction, the position (coordinates) of the writing start point is determined depending on the direction of movement of the angle of view. At this time, the position of the writing start point is determined in such a manner that an edge of an area in which a first texture is written is not brought into contact with an edge of a joined image frame. This configuration makes it possible to obtain a substantially wide writing area on the frame memory. Further, the frame memory can be effectively used and the joined image having a larger pixel size can be generated. Consequently, the joined image can be appropriately generated.

A second feature of the image processing apparatus according to an exemplary embodiment is to sequentially display the write state on the frame memory into which the joined image is written. Specifically, during the obtainment of the images constituting the joined image, the write state is displayed so as to indicate the obtained part of the joined image on the frame memory. This configuration enables the user to capture images while checking a margin from an edge of the joined image frame. Accordingly, the textures can be prevented from running off the edge of the frame memory, and thus the joined image can be appropriately generated.

First Exemplary Embodiment

An image processing apparatus and a camera according to a first exemplary embodiment of the present invention will be described below with reference to the drawings. FIG. 1 is a block diagram showing a configuration of a camera 100.

Figure 2:
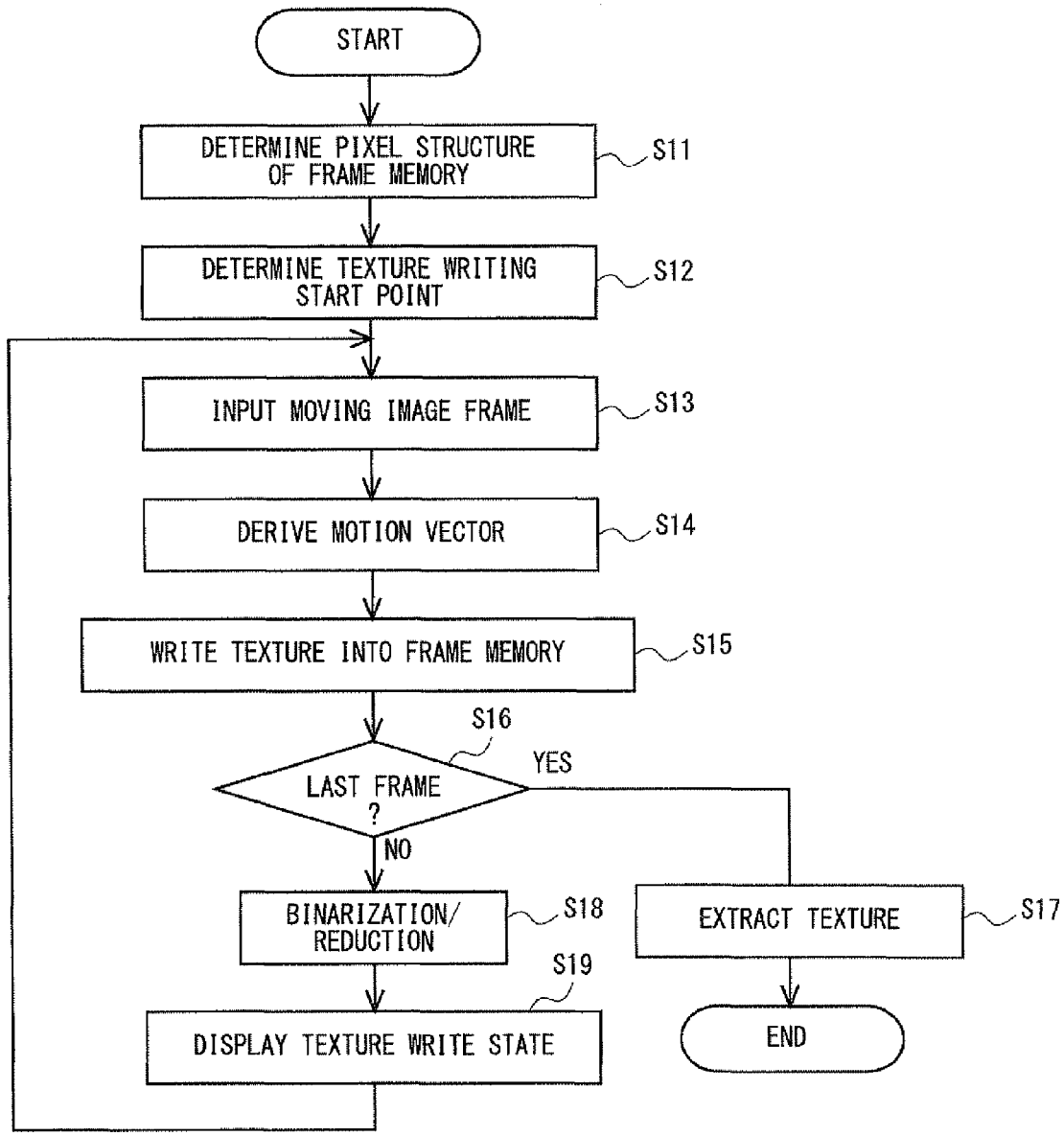
FIG. 2 is a flowchart showing an image processing method according to the first exemplary embodiment.

FIG. 2 is a flowchart showing image processing in an image processing apparatus 20. The camera 100 includes an image pickup unit 10, the image processing apparatus 20, and a display unit 30.

The image pickup unit 10 generates a moving image by photoelectrically converting light from a subject. The light is input to an image pickup device 11 through an imaging lens 12. The image pickup unit 10 outputs the generated moving image to the image processing apparatus 20. The image pickup device 11 is a CCD (Charge Coupled Device) or a CMOS (Complementary Metal Oxide Sensor) device. The moving image obtained by the image pickup unit 10 is input to the image processing apparatus 20 and the display unit 30. The display unit 30 includes a display device such as a liquid crystal display or an organic EL (Electroluminescence) display. The display unit 30 displays the moving image obtained by the image pickup unit 10. Specifically, the display unit 30 sequentially displays each frame of the moving image. The camera 100 is provided with an operation unit (not shown) with which the user operates the camera. For example, when a touch panel is used as the display unit 30, the display unit 30 serves as the operation unit. The operation unit may be buttons or the like.

The image processing apparatus 20 performs image processing for generating a joined image from moving images. The image processing apparatus 20 includes a motion vector derivation unit 21, a frame memory 22, a pixel structure determination unit 23, a start point determination unit 24, a binarization/reduction unit 25, a state display unit 26, and an extraction unit 27. The frame memory 22 has a predetermined number of pixels in the vertical direction and the horizontal direction. For example, the frame memory 22 has a rectangular pixel structure. In the frame memory 22, the textures that form the joined image are written at each pixel position corresponding to a motion vector between pixels.

Each block in the image processing apparatus 20 can be implemented in a hardware manner by a CPU (Central Processing Unit), a memory, and other LSI (Large Scale Integration) of any computer, and can be implemented in a software manner by, for example, a program loaded into the memory. FIG. 1 illustrates the functional blocks implemented in a cooperative manner. Accordingly, it can be understood by those skilled in the art that these functional blocks can be implemented in various manners by, for example, using only hardware, using only software, or using a combination thereof.

The processing of each block in the image processing apparatus 20 will be described below with reference to FIG. 2. The processing for generating a joined image will be described below. Since well-known techniques can be used for normal processing in the camera 100, i.e., processing other than the processing for generating a joined image, the description of the normal processing is omitted.

First, the pixel structure determination unit 23 determines the pixel structure (joined image frame) of the frame memory 22 (S11). Specifically, the pixel structure determination unit 23 determines the number of pixels in each of the horizontal and vertical directions. The pixel structure determination unit 23 makes this determination while taking into consideration the total capacity of the frame memory and maintaining the balance between the pixels in the horizontal direction and the pixels in the vertical direction. Specifically, depending on the shape of the subject, when the pixel structure is likely to be horizontally long, the number of pixels in the horizontal direction is increased, while when the pixel structure is likely to be vertically long, the number of pixels in the vertical direction is increased. When the user intends to secure a free motion, the pixel structure may be set so as to have a shape approximate to a square shape. This determination can be made by the user in the form of, for example, mode selection during photographing.

For example, the display unit 30 displays touch buttons or the like for the user to select the image pickup direction to be changed. Examples of the touch buttons to be displayed on the display unit 30 include (0: normal), (1: from left to right), (2: from right to left), (3: from top to bottom), and (4: from bottom to top). The user selects one mode from among the modes 0 to 4.

Figure 3:
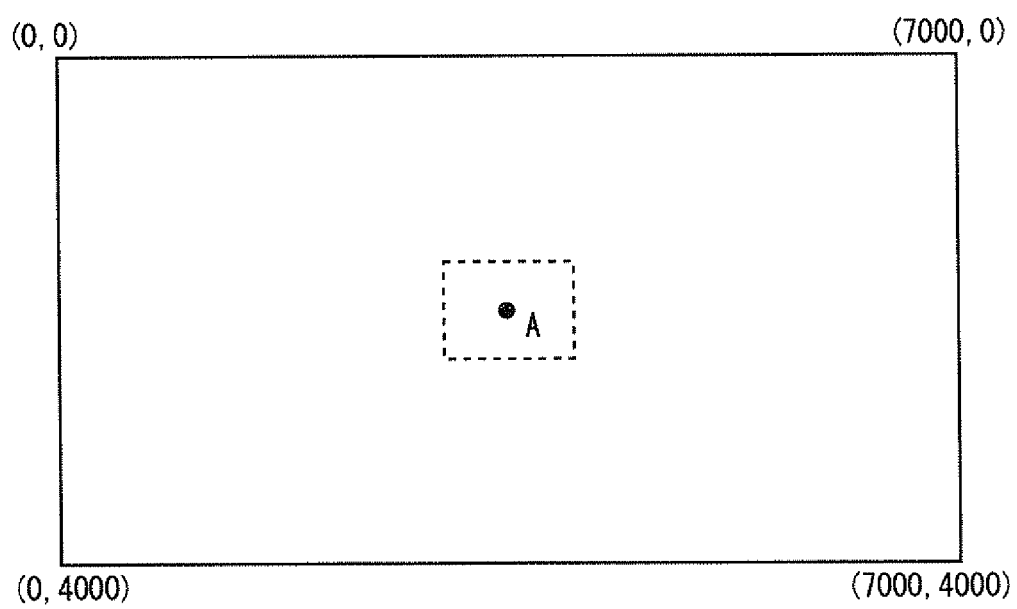
FIG. 3 is a diagram for explaining a pixel structure (joined image frame) of a frame memory.

When the user cannot predict the motion of the camera 100, or when the user intends to move the camera 100 in a two-dimensional manner, the user selects the mode (0: normal). FIG. 3 is a diagram showing the pixel structure of the frame memory 22 when the user selects the mode (0: normal). The frame memory 22 has a pixel structure of 7000×4000 pixels in width and height.

Figure 4:
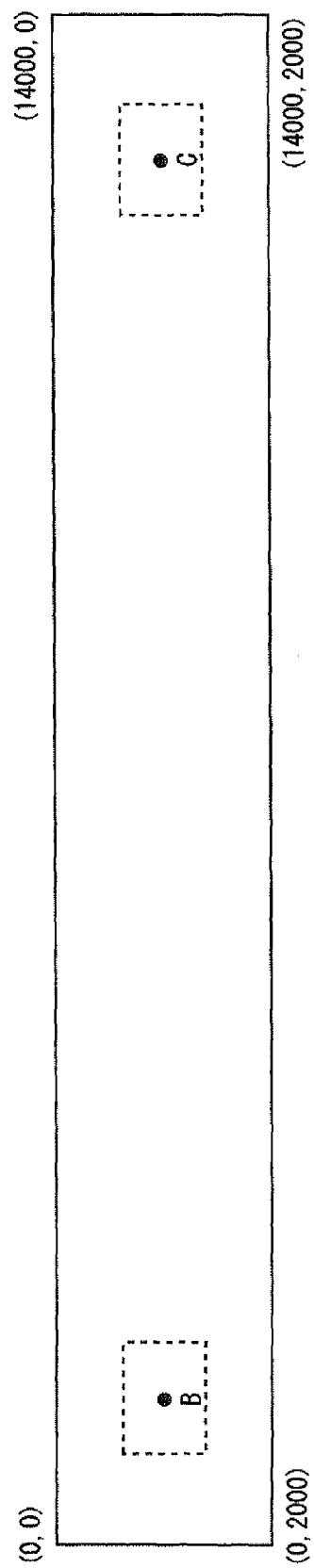
FIG. 4 is a diagram for explaining a pixel structure (joined image frame) of the frame memory when the direction of a camera is changed to the horizontal direction.

When the user intends to perform a pan operation in the horizontal direction, the user selects the mode (1: from left to right) or the mode (2: from right to left). FIG. 4 shows the pixel structure of the frame memory when the user selects the mode (1: from left to right) or the mode (2: from right to left). The frame memory 22 has a pixel structure of 14000×2000 pixels in width and height. That is, the pixel size in height is half the pixel size obtained when the mode (0: normal) is selected, and the pixel size in width is twice the pixel size obtained when the mode (0: normal) is selected.

Figure 5:
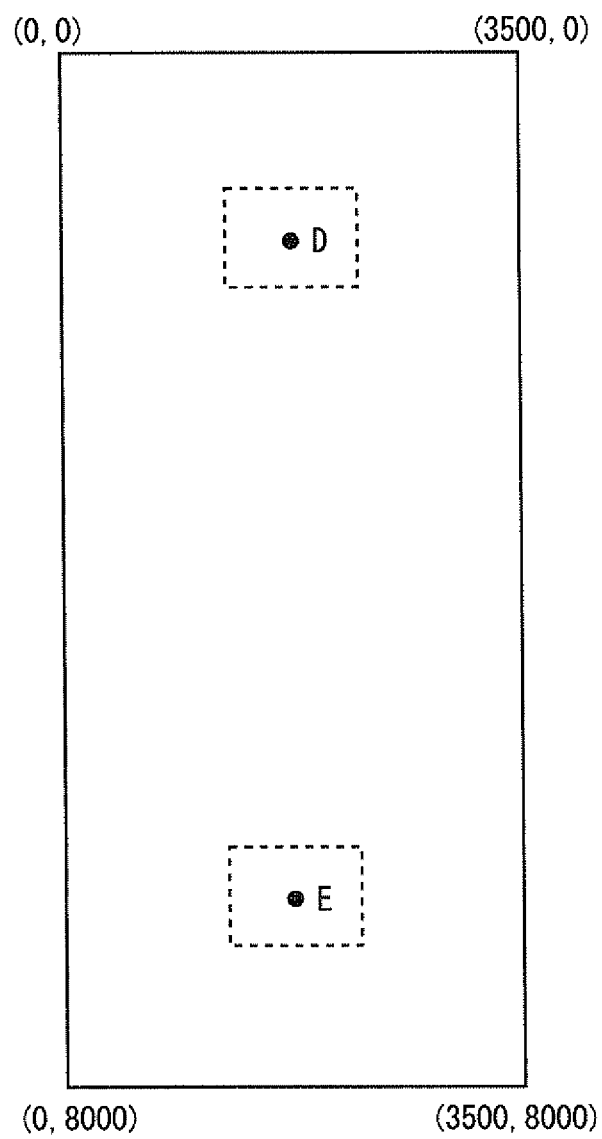
FIG. 5 is a diagram for explaining a pixel structure (joined image frame) of the frame memory when the direction of the camera is changed to the vertical direction.

When the user intends to perform a tilt operation in the vertical direction, the user selects the modes (3: from top to bottom) and (4: from bottom to top). FIG. 5 shows the pixel structure of the frame memory 22 when the user selects the modes (3: from top to bottom) and (4: from bottom to top). The frame memory 22 has a pixel structure of 3500×8000 pixels in width and height. That is, the pixel size in height is twice the pixel size obtained when the mode (0: normal) is selected, and the pixel size in width is half the pixel size obtained when the mode (0: normal) is selected. Regardless of which one of the modes 0 to 4 is selected, the frame memory 22 has the same total number of pixels.

In this manner, the user selects the direction in which the camera 100 is to be moved. Specifically, the direction in which the user intends to move the angle of view of the camera is input to the pixel structure determination unit 23 as image pickup direction information. The pixel structure of the frame memory 22 is changed according to the image pickup direction information. Specifically, the pixel structure determination unit 23 changes the number of pixels in height and width of the frame memory, to thereby change the shape of the joined image frame. The pixel structure determination unit 23 can determine the pixel structure of a rectangular shape with a desired size.

In this manner, when it is assumed that the image pickup direction is changed to the longitudinal direction and the lateral direction, the pixel structure determination unit 23 sets a normal aspect ratio for the joined image frame. When it is assumed that the user performs a pan operation in the horizontal direction (right-left direction) on the camera 100, the pixel structure determination unit 23 sets the pixel structure of the frame memory 22 to be horizontally longer than the normal size. On the other hand, when it is assumed that the user performs a tilt operation in the vertical direction (up-down direction) on the camera 100, the pixel structure determination unit 23 sets the pixel structure of the frame memory 22 to be vertically longer than the normal size. Note that in each of the cases of FIGS. 3 to 5, the frame memory 22 has the same total number of pixels. In other words, the pixel structure determination unit 23 determines the pixel structure so that it does not exceed the capacity of the frame memory 22.

The number of pixels in height and width of the frame memory 22 and the aspect ratio thereof are not limited to the values shown in FIGS. 3 to 5, as a matter of course. For example, the values may be determined depending on the number of pixels of the image pickup device 11. Further, while the five modes 0 to 4 have been illustrated above, more than five modes may be set so that the pixel structure can be set more finely. This makes it possible to set the pixel structure (joined image frame) of the frame memory 22 to have a more appropriate pixel size. Furthermore, the pixel structure may be manually set by a method other than mode selection. For example, the user may directly input the aspect ratio or the number of pixels in height and width.

Figure 6:
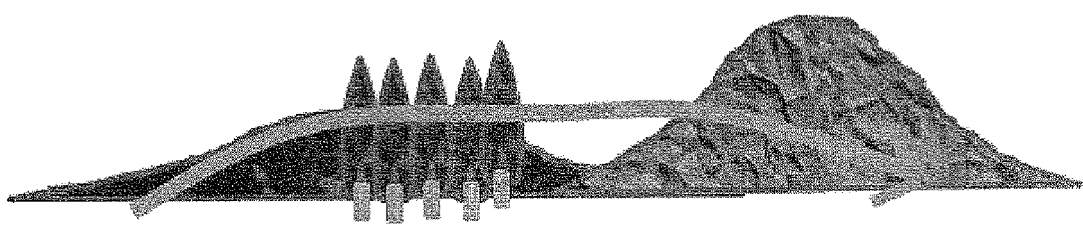
FIG. 6 is a diagram for explaining a motion of an image pickup device in the case of obtaining a joined image.

Next, the start point determination unit 24 sets a texture writing start point (S12). Specifically, the start point determination unit 24 designates the coordinates of the writing start point on the joined image frame. At this time, the start point determination unit 24 preferably designates the coordinates of the area, in which the first texture is written, in such a manner that the area in which the first texture is written is not brought into contact with an edge of the joined image frame. This configuration makes it possible to provide a margin in each of the vertical and horizontal directions, and enables the user to perform photographing along a trajectory with a high degree of freedom. Each area surrounded by a broken line in FIGS. 4 to 6 represents the area in which the first texture is written. This area is determined depending on the shape of the subject, or how to move the angle of view of the camera. This determination can also be made by the user in the form of, for example, mode selection during photographing. Specifically, the coordinates of the writing start point on the joined image frame are determined depending on which one of the buttons corresponding to the modes (0: normal) to (4: from bottom to top) is pressed.

For example, when the mode (1: from left to right) is selected, the position indicated by "B" in FIG. 4 is set as the writing start point. Specifically, since the angle of view of the camera is moved from left to right, the writing start point is set at a position on the left side relative to the center of the joined image frame. When it is assumed that a pan operation is performed from left to right, the writing start point is set in the vicinity of the left edge of the joined image frame.

On the other hand, when the mode (2: from right to left) is selected, the position indicated by "C" in FIG. 4 is set as the writing start point. Specifically, since the angle of view of the camera is moved from right to left, the writing start point is set at a position on the right side relative to the center of the joined image frame. When it is assumed that a pan operation is performed from right to left, the writing start point is set in the vicinity of the right edge of the joined image frame.

When the mode (3: from top to bottom) is selected, the position indicated by "D" in FIG. 5 is set as the writing start point. Specifically, since the angle of view of the camera is moved from top to bottom, the writing start point is set at a position on the upper side relative to the center of the joined image frame. When it is assumed that a tilt operation is performed from top to bottom, the writing start point is set in the vicinity of the upper edge of the joined image frame.

On the other hand, when the mode (4: from bottom to top) is selected, the position indicated by "E" in FIG. 5 is set as the writing start point. Specifically, since the angle of view of the camera is moved from bottom to top, the writing start point is set at a position on the lower side relative to the center of the joined image frame. When it is assumed that a pan operation is performed from bottom to top, the writing start point is set in the vicinity of the lower edge of the joined image frame.

When the mode (0: normal) is selected, the center of the joined image frame is set as the writing start point as shown in FIG. 3. Specifically, the position indicated by "A" in FIG. 3 is set as the writing start point. In a case where the motion of the camera is unpredictable, an area including the center of the joined image frame is preferably set as the area in which the first texture is written, so as to provide a margin in each of the up, down, right and left directions.

Thus, the direction in which the angle of view of the camera is moved by the user is input to the start point determination unit 24 as the image pickup direction information. The start point determination unit 24 sets the writing start point on the joined image frame according to the image pickup direction information. The texture of a first frame image is written at the writing start point.

The writing start point may be set by a method other than the above-described mode selection. For example, the user may directly input the coordinates of the writing start point. Alternatively, the user may input the writing start point on a touch panel in the state where the pixel structure of the frame memory is displayed on the display unit 30. The mode selection for determining the pixel structure and the mode selection for determining the writing start point may be performed separately. The determination of the pixel structure (S11) and the determination of the writing start point (S12) may be performed at the same time.

When the determination of the pixel structure and the determination of the writing start point are completed, moving image frames are input (S13). Specifically, when the user presses an image-pickup start button or the like, the image pickup unit 10 captures a moving image. In other words, the image pickup unit 10 sequentially captures the frame images constituting the moving image. Thus, the frame images of the moving image are input to the image processing apparatus 20. As described above, the texture of the first frame image is written at the position corresponding to the writing start point on the joined image frame.

Next, the motion vector derivation unit 21 derives a motion vector based on the input images from the image pickup unit 10 (S14). The motion vector derivation unit 21 derives, for example, a global motion vector between two successive frame images. A well-known matching evaluation method can be used to derive the motion vector. For example, the motion vector derivation unit 21 performs matching between the two frame images pixel by pixel, and detects, as a motion, the amount of displacement obtained when the error is minimized. Then the motion vector derivation unit 21 derives the motion between the frame images in the form of a two-dimensional vector.

The texture writing unit 31 overwrites the frame memory 22 with the textures based on the motion vector (S15). Since the motion vector represents a positional displacement between the frame images, the positional adjustment of the frames is performed according to the motion vector. The texture writing unit 31 overwrites the frame memory 22 with the subsequent frame image. In the joined image frame, the texture of the latest frame image is written at the position corresponding to the motion vector. The texture writing unit 31 writes the textures, which form the joined image, into the joined image frame according to the writing start point and the motion between the images. In this manner, the processing for joining the textures is carried out. Note that the texture writing unit 31 writes the first texture among the plurality of textures into an area that is not in contact with an edge of the joined image frame.

Next, it is confirmed whether or not the frame is the last frame (S16). In other words, it is judged whether the user has finished obtaining the moving image. When the frame is not the last frame (NO in S16), the binarization/reduction unit 25 performs binarization/reduction processing based on the presence or absence of textures on the joined image frame (S18). For example, the binarization/reduction unit 25 sets, as a first value, a pixel where a texture is written in the joined image frame, and sets, as a second value, a pixel where no texture is written in the joined image frame. Thus, the binarized image corresponding to the pixel structure of the frame memory 22 is generated. For example, referring to FIG. 3, the binarized image having a pixel size of 4000×7000 pixels in height and width is generated. To display the binarized image on the display unit 30, the binarization/reduction unit 25 reduces the size of the binarized image. In other words, the binarization/reduction unit 25 reduces the size of the binarized image so that the binarized image has an image size corresponding to the monitor size of the display unit 30.

When the binarization/reduction unit 25 reduces the size of the binarized image to thereby generate a binarized/reduced image, the state display unit 26 displays the write state of the joined image frame on the display screen of the display unit 30 (S19). Specifically, the state display unit 26 displays the binarized/reduced image as the write state on the display screen of the display unit 30. The display unit 30 displays the latest write state together with the moving image captured by the image pickup unit 10. When the display unit 30 displays the write state, the process returns to S13.

The processes of S13, S14, S18, and S19 are repeated until the user finishes obtaining the moving image and the last frame is obtained. Specifically, every time a moving image frame is input (S13), the following processes are repeated. That is, derivation of a motion vector (S14), overwriting of the joined image frame with a texture (S15), binarization/reduction processing (S18), and display of a texture overwriting state (S19). Thus, the frame memory 22 is repeatedly overwritten with the texture of the latest frame image. The display unit 30 displays the latest moving image and write state. This enables the user to change the photographing direction while recognizing the latest write state.

When the frame is the last frame (YES in S16), the extraction unit 27 extracts the textures written in the joined image frame (S17). When the last frame of the moving image is written, the processing for joining the textures is completed. The extraction unit 27 extracts an area having a minimum rectangular size and including the portion in which textures are present on the joined image frame. Thus, a rectangular joined image is completed. Then the display unit 30 displays the joined image.

A specific example in which a panoramic image of a landscape is taken along the direction indicated by the arrow as shown in FIG. 6 will now be described. Referring to FIG. 6, the image pickup direction is changed from left to right in a slightly convex manner. The resolution of the moving image captured by the image pickup unit 10 is 400×300 pixels in width and height. The pixel size of the joined image frame is 7000×4000 pixels in width and height. The texture writing start point is set at the center (3500, 2000) of the joined image frame. That is, the pixel structure and the start point shown in FIG. 3 are adopted.

Figure 7:
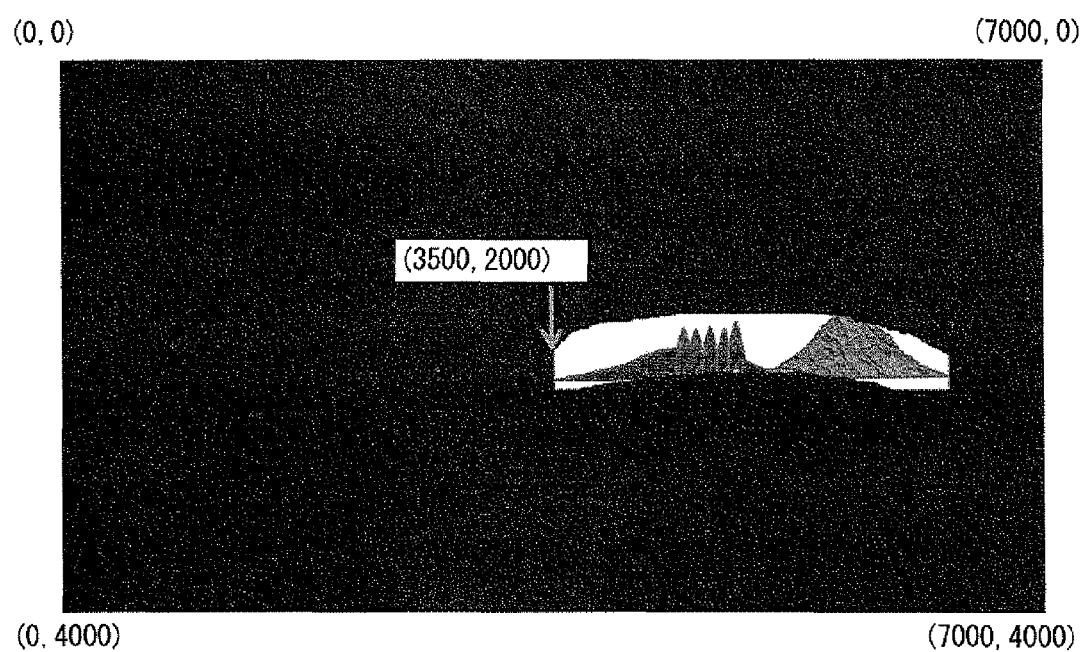
FIG. 7 is a diagram showing textures written in the frame memory.
Figure 8:
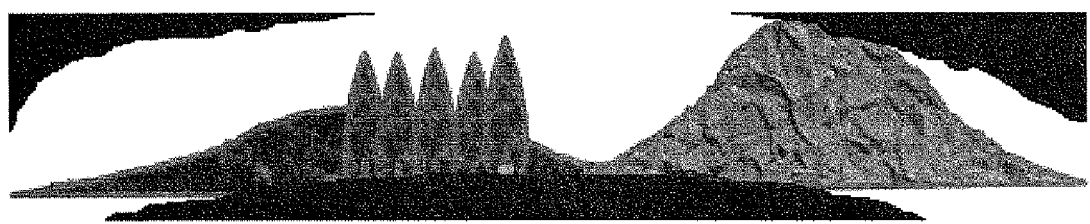
FIG. 8 is a diagram showing a joined image.

FIG. 7 shows the pixel structure of the frame memory 22 and the textures written in the joined image frame. The textures formed of a plurality of frame images are written in a part of the joined image frame. FIG. 8 shows the joined image finally obtained. The rectangular area in which the textures are written corresponds to the joined image. That is, the minimum rectangular area including all pixels where textures are written corresponds to the joined area in the joined image frame.

FIG. 7 shows information about the trajectory along which the textures are overwritten on the joined image frame, and information about the degree of margin of movement of the angle of view. Accordingly, the display unit 30 displays the information shown in FIG. 7, thereby allowing the user to recognize the write state. In this case, however, detailed texture information is not required to be displayed as photographing guide information. In general, if a photographing system is mounted with a display system for displaying detailed images as shown in FIG. 7, the load on the processor and the like increases.

Figure 9:
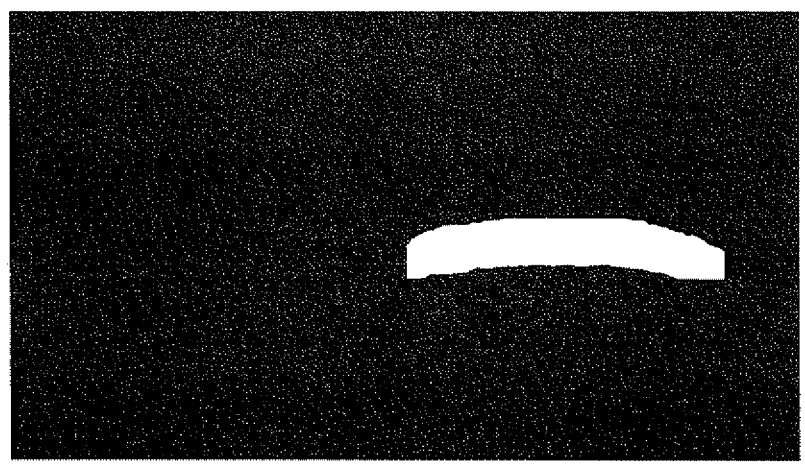
FIG. 9 is a diagram for explaining a write state of the frame memory.

Accordingly, it is preferable to use a simplified display for the user to check the degree of margin of the angle of view on the joined image frame. For this reason, the binarization/reduction unit 25 generates a binarized image by performing binarization based on the presence or absence of textures on the joined image frame. Further, the binarization/reduction unit 25 generates a binarized/reduced image by reducing the size of the binarized image. FIG. 9 shows the reduced binarized image. Specifically, the binarized/reduced image is a monochrome image in which the pixels where textures are written are displayed in white and the pixels where no textures are written are displayed in black in the joined image frame.

Figure 10:
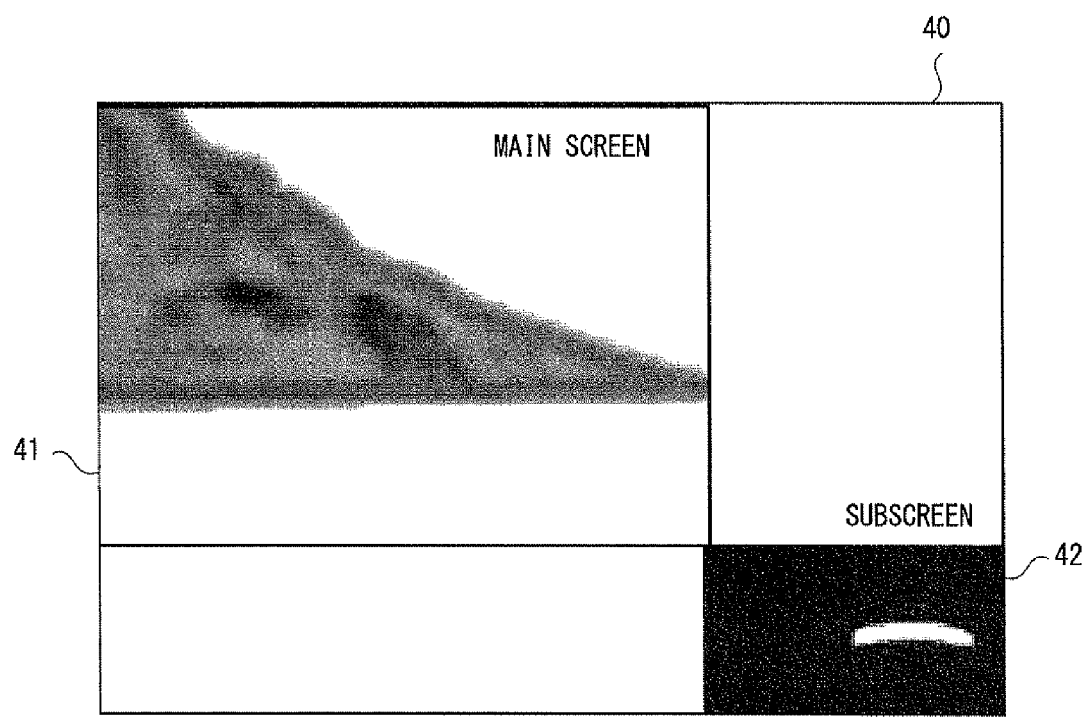
FIG. 10 is a diagram showing a display screen of a display unit.

FIG. 10 shows a display screen 40 that displays the moving image frame and the binarized/reduced image. An image display area 41 serving as a main screen is located in the upper left area of the rectangular display screen 40, and a state display area 42 serving as a subscreen is located in the lower right area of the display screen 40. In the image display area 41, the frame images of the moving image captured by the image pickup unit 10 are sequentially displayed. In the state display area 42, the binarized/reduced image is displayed. The state display area 42 includes an area representing the portion in which textures are written in the joined image frame, and an area representing the portion in which no textures are written in the joined image frame. The image display area 41 and the state display area 42 each have a rectangular shape. The image display area 41 and the state display area 42 are partitioned without overlapping each other. The size of the image display area 41 is larger than that of the state display area 42. The image display area 41 and the state display area 42 are separately displayed at different locations on the display screen 40. The size of the state display area 42 on the display screen 40 may be variable depending on the pixel structure determined by the pixel structure determination unit 23. In other words, the aspect ratio of the state display area 42 may be changed depending on the aspect ratio of the frame memory 22.

In this manner, the display screen 40 of the display unit 30 displays both the current frame image and the trajectory leading to the current frame image on the joined image frame. This enables the user to perform photographing with a free motion while checking the margin of movement of the angle of view in the state display area 42. Further, the latest write position may be displayed in the state display area 42. Furthermore, the user can set the angle of view of the camera at a position where no textures are written in the joined image frame, thereby making it possible to obtain a wider joined image.

As described above, the start point determination unit 24 determines the writing start point on the joined image frame. In other words, the writing start point on the joined image frame is variable. Therefore, a margin can be provided for the joined image frame in the direction in which the angle of view is moved. The frame memory 22 having a limited pixel size can be effectively used. Even when the user greatly moves the camera, the textures are prevented from running off the edge of the joined image frame. Accordingly, the textures can be appropriately joined together.

Further, the pixel structure determination unit 23 determines the pixel structure of the frame memory 22. In other words, the pixel structure of the frame memory 22 is variable. The pixel structure determination unit 23 changes the aspect ratio of the pixel structure depending on the direction of movement of the angle of view, or the image pickup direction information. When the user sets the image pickup direction in the up-down direction, the aspect ratio is set to be vertically long, and when the user sets the image pickup direction in the right-left direction, the aspect ratio is set to be horizontally long.

With this configuration, a margin can be provided for the joined image frame in the direction in which the angle of view is moved. The frame memory 22 having a limited pixel size can be effectively used. Even when the user greatly moves the camera, the textures are prevented from running off the edge of the joined image frame. Accordingly, the textures can be appropriately joined together. Note that the minimum size in height or width of the pixel structure of the frame memory 22 may be determined depending on the pixel size of the image pickup device 11. In other words, the pixel structure of the frame memory 22 may be equal to or larger than the size of an area in which an image corresponding to one frame is written. For example, the minimum size in height of the pixel structure of the frame memory 22 may be equal to or larger than the size in height of one frame image of the image pickup device 11. When the size in height of the pixel structure of the frame memory 22 is set as the size in height of one frame image of the image pickup device 11, the joined image frame has a widest pixel structure.

The state display unit 26 displays the write state in a part of the display screen 40 of the display unit 30. This enables the user to check the margin of movement of the angle of view on the joined image frame during photographing. The textures are prevented from running off the edge of the joined image frame, and thus the textures can be appropriately joined together. Furthermore, the user can set the angle of view of the camera at a position where no textures are written in the joined image frame, thereby making it possible to obtain a wider joined image. Moreover, the size of the state display area 42 and that of the image display area 41 on the display screen 40 may be changed depending on the size of the pixel structure of the frame memory 22.

The binarization/reduction unit 25 generates the binarized/reduced image to display the write state. In other words, the binarization/reduction unit 25 binarizes information on the presence or absence of textures on the joined image frame. This configuration simplifies the processing for displaying the write state. Further, even on a small subscreen, checking can be facilitated. For example, when the binarized image is displayed in black and white, the contrast is high, which allows the user to easily recognize the write state. The binarized image can also be displayed in colors other than black and white.

The above-described method facilitates judgment of the degree of margin with which the camera can be moved, by providing information about which portion of the current joined image frame is overwritten, during the creation of a still image by joining moving images photographed by the user while freely moving the camera in a two-dimensional manner. If the camera 100 is mounted on a camera platform capable of performing a pan/tilt operation, the camera 100 can be electrically moved instead of being manually moved. For example, the user may change the image pickup direction by operating a remote controller or the like while checking the display unit 30.

Further, in the first exemplary embodiment, one or more of the pixel structure determination unit 23, the binarization/reduction unit 25, and the state display unit 26 may be omitted. For example, the determination of the pixel structure by the pixel structure determination unit 23 is not necessarily performed, and the structure of the frame memory 22 may not be variable. In this case, the start point determination unit 24 determines the writing start point for the joined image frame having a specified pixel structure. Alternatively, the display unit 30 may not display the binarized/reduced image indicating the write state.

Second Exemplary Embodiment

Figure 11:
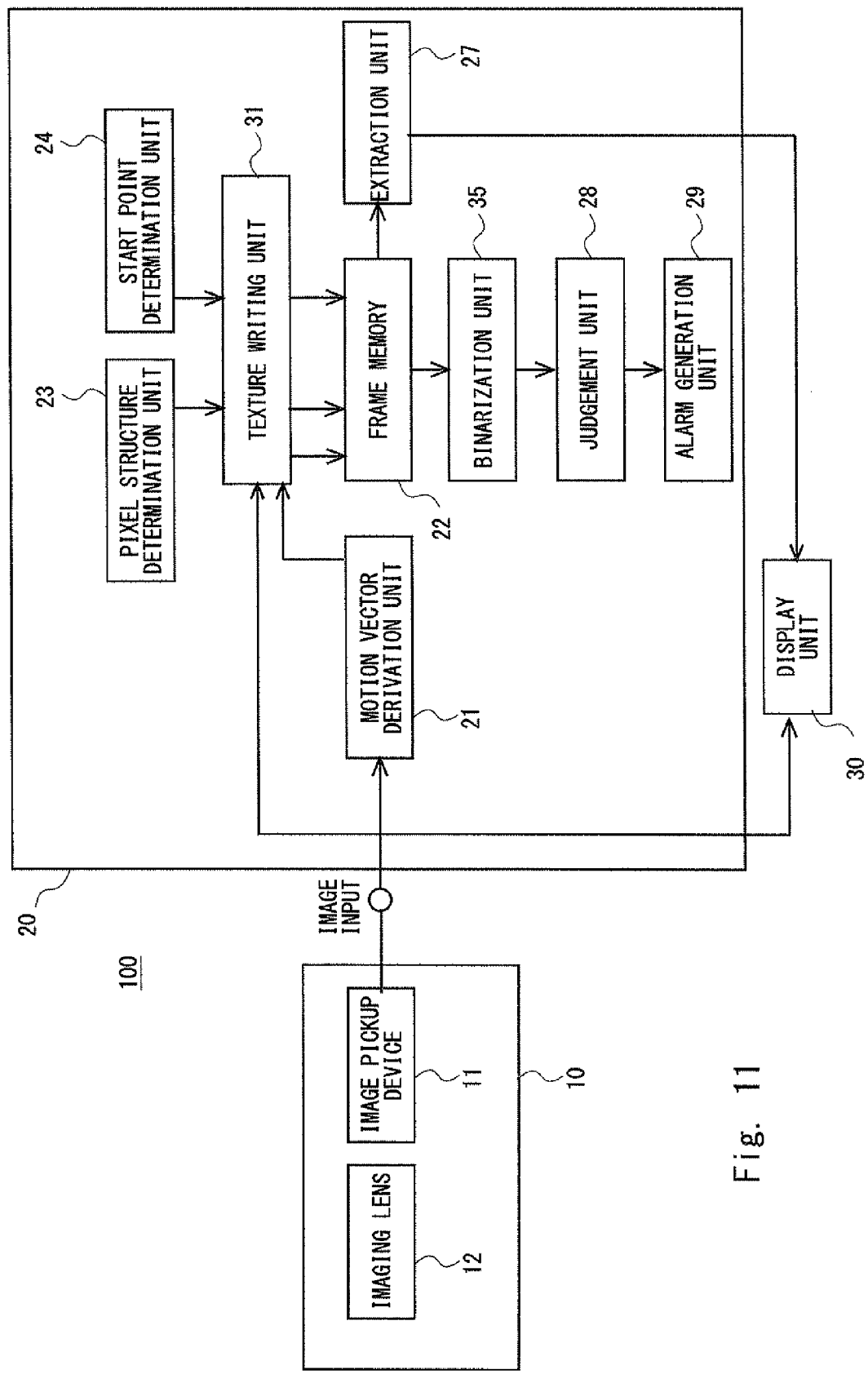
FIG. 11 is a block diagram showing a configuration of a camera according to a second exemplary embodiment.
Figure 12:
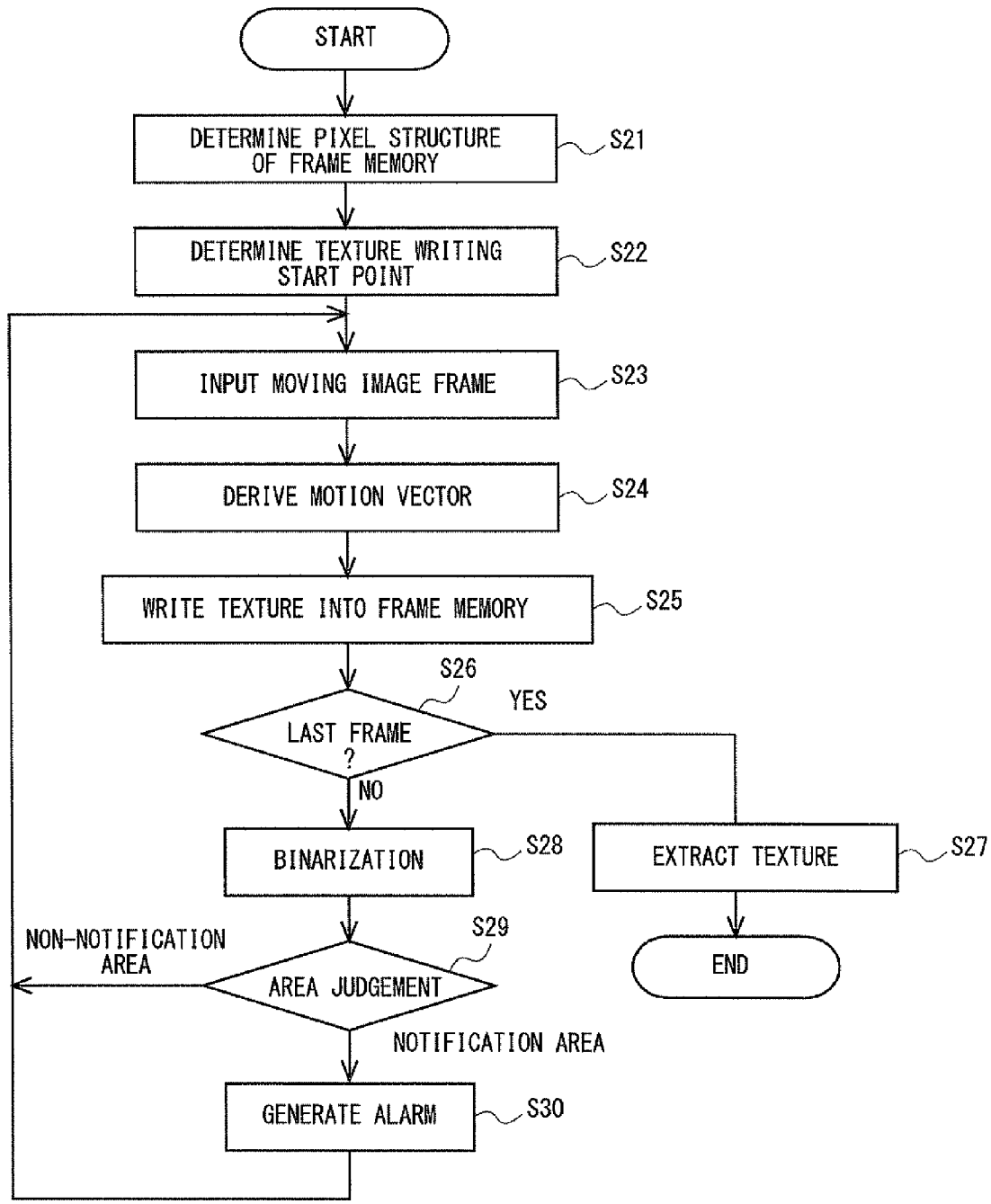
FIG. 12 is a flowchart showing an image processing method according to the second exemplary embodiment.

A second exemplary embodiment of the present invention will be described with reference to FIGS. 11 and 12. FIG. 11 is a block diagram showing the camera 100 that incorporates an image processing apparatus according to the second exemplary embodiment. FIG. 12 is a flowchart showing a processing method for the image processing apparatus.

The second exemplary embodiment differs from the first exemplary embodiment in that a judgment unit 28 and an alarm generation unit 29 are provided instead of the state display unit 26. Further, the second exemplary embodiment differs from the first exemplary embodiment in that the binarization/reduction unit 25 is replaced by a binarization unit 35. Since the second exemplary embodiment is similar to the first exemplary embodiment except for these differences, the description thereof is omitted. Specifically, since the image pickup unit 10, the motion vector derivation unit 21, the frame memory 22, the pixel structure determination unit 23, the start point determination unit 24, the extraction unit 27, and the display unit 30 are the same as those of the first exemplary embodiment, the description thereof is omitted. Steps S21 to S27 are similar to steps S11 to S17 shown in FIG. 2, and thus the description thereof is omitted.

The processing of the blocks such as the binarization unit 35, the judgment unit 28, and the alarm generation unit 29 will be described below with reference to the flowchart of FIG. 12. When the frame is not the last frame (NO in S26), the binarization unit 35 performs binarization processing based on the presence or absence of textures on the joined image frame, as in the first exemplary embodiment (S28). Note that in the second exemplary embodiment, the write state is not displayed on the display screen. Accordingly, the size of the binarized image is not reduced. The judgment unit 28 judges whether or not textures are written in a notification area, based on the binarized image (S29).

Figure 13:
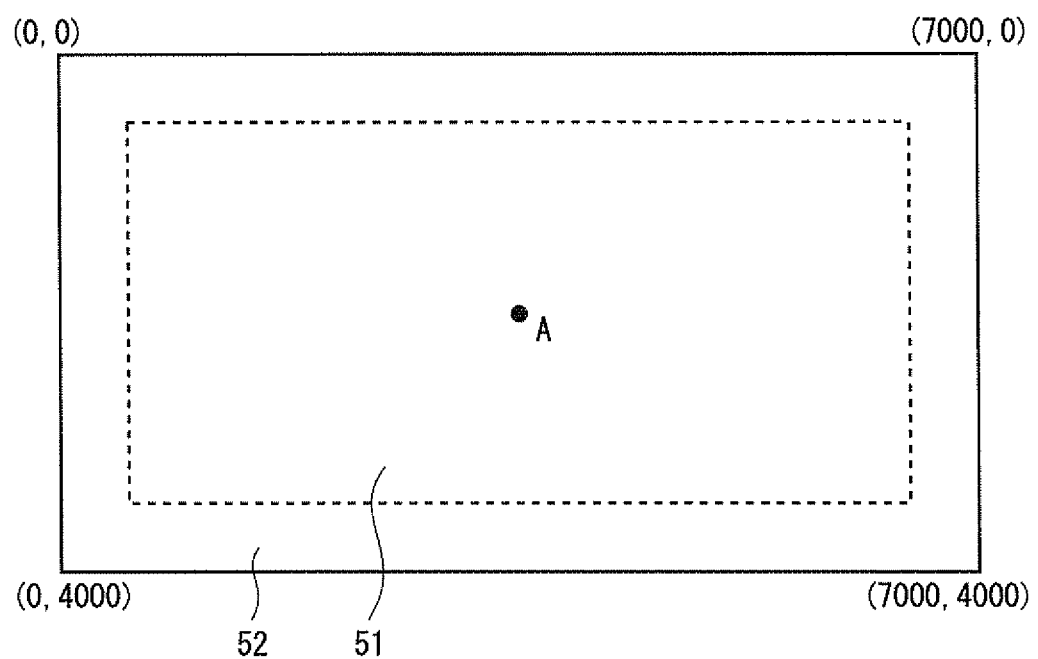
FIG. 13 is a diagram showing a notification area in the frame memory.

FIG. 13 is a diagram showing a non-notification area 51 and a notification area 52 on the joined image frame. The non-notification area 51 has a rectangular shape smaller than the pixel size of the joined image frame. For example, the non-notification area 51 is a rectangular area in which the number of pixels in the horizontal and vertical directions is 80% of the pixel size of the joined image frame, and the center of the rectangular area matches the center of the joined image frame. The notification area 52 is an area outside the non-notification area 51. The notification area 52 has a frame shape surrounding the non-notification area 51. The judgment unit 28 judges whether or not to update the notification area 52 during photographing.

When textures are written in the notification area 52, the alarm generation unit 29 generates an alarm (S30), and the process returns to S23. On the other hand, when no textures are written in the notification area 52, i.e., when textures are written in the non-notification area 51, the process returns to S23 without generating an alarm. In this manner, when the texture writing position has approached an edge of the joined image frame, the alarm generation unit 29 generates an alarm to notify the user to that effect.

In the case where textures are written in the notification area 52 of the joined image frame, if the angle of view of the camera is continuously moved, the texture overwriting position may run off the edge of the joined image frame. This makes it impossible to record the textures. To avoid this, the alarm generation unit 29 generates an alarm. In other words, the alarm generation unit 29 serves as a notification unit that notifies the user that textures are written in the vicinity of the edge of the joined image frame. The display unit 30 displays a character message or the like as an alarm to indicate that textures are written in the vicinity of the edge of the joined image frame. Alternatively, the alarm can be visually indicated by, for example, a character message, a sign, an illustration, or a color change, can be audibly indicated by, for example, beep sound or a verbal message, or can be haptically indicated by, for example, a vibrator.

In this manner, the user can change the image pickup direction so as to prevent the texture overwriting position from running off the edge of the frame memory 22. Accordingly, a more appropriate joined image can be generated.

Note that the first exemplary embodiment may be combined with the second exemplary embodiment. Specifically, the state display area 42 may be displayed on the display screen 40, and when the texture writing position has approached an edge of the joined image frame, an alarm may be generated.

The whole or part of the image processing described above may be implemented by a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

While the invention made by the present inventor has been described in detail above with reference to exemplary embodiments, the present invention is not limited to the above exemplary embodiments, and can be modified in various manners without departing from the scope of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

According to the present invention, it is possible to provide an image processing apparatus, an image processing method, a program, and a camera which are capable of generating a joined image based on images captured along a trajectory with a high degree of freedom.

The above and other objects, features and advantages of the present invention will become more fully understood from the detailed description given hereinabove and the accompanying drawings which are given by way of illustration only, and thus are not to be considered as limiting the present invention.

What is claimed is:

1. An image processing apparatus that generates a joined image by joining a plurality of textures based on a plurality of images, the image processing apparatus comprising:
   a derivation unit configured to derive a motion between images of the plurality of images;
   a frame memory in which a joined image frame is set and the plurality of textures that form the joined image are written;
   a pixel structure determination unit configured to determine the joined image frame as a first rectangular pixel structure when an user designates image pickup direction information as a horizontal direction, and configured to determine the pixel structure determination unit determines the joined image frame as a second rectangular pixel structure when the user designates the image pickup direction as a perpendicular direction,
   a texture writing unit configured to write the plurality of textures into the frame memory based on the motion between the images,
   wherein the texture writing unit writes a first texture among the plurality of textures into an area that is not in contact with an edge of the joined image frame,
   wherein, in the first rectangular pixel structure, the number of the pixels in the horizontal direction is larger than the number of the pixels in the perpendicular direction,
   wherein in the second rectangular pixel structure, the number of the pixels in the perpendicular direction is larger than the number of the pixels in the horizontal direction, and
   wherein a total number of the pixels in the first rectangular pixel structure is the same as a total number of the pixels in the second rectangular pixel structure,
   wherein the derivation unit, the pixel structure determination unit and texture writing unit includes at least one of a CPU, a memory and an LSI.

2. The image processing apparatus according to claim 1, further comprising a notification unit that notifies a user that a write position of the textures to be written into the joined image frame has approached an edge of the joined image frame,
   wherein the notification unit includes at least one of a CPU, a memory and an LSI.

3. A camera comprising:
   the image processing apparatus according to claim 1; and
   an image pickup unit that captures the plurality of images.

4. An image processing method that generates a joined image by joining a plurality of textures based on a plurality of images, the image processing method comprising:
   deriving a motion between images of the plurality of images;
   setting a joined image frame in a frame memory into which the plurality of textures that form the joined image are written;
   determines the joined image frame as a first rectangular pixel structure when a user designates the image pickup direction information as the horizontal direction, and determines the joined image frame as a second rectangular pixel structure when the user designates the image pickup direction information as a perpendicular direction; and
   writing, based on the motion between the images, the plurality of textures into the frame memory into which the textures that form the joined image are written,
   wherein in the writing of the textures, a first texture among the plurality of textures is written into an area that is not in contact with an edge of the joined image frame,
   wherein, in the first rectangular pixel structure, the number of the pixels in the horizontal direction is larger than the number of the pixels in the perpendicular direction,
   wherein, in the second rectangular pixel structure, the number of the pixels in the perpendicular direction is larger than the number of the pixels in the horizontal direction, and
   wherein a total number of the pixels in the first rectangular pixel structure is the same as a total number of the pixels in the second rectangular pixel structure.

5. A non-transitory computer readable medium storing a program for causing a computer to execute image processing that generates a joined image by joining a plurality of textures based on a plurality of images, the image processing comprising:
   deriving a motion between images of the plurality of images;
   setting a joined image frame in a frame memory into which the plurality of textures that form the joined image are written;
   determines the joined image frame as a first rectangular pixel structure when a user designates the image pickup direction information as the horizontal direction, and determines the joined image frame as a second rectangular pixel structure when the user designates the image pickup direction information as a perpendicular direction; and
   writing, based on the motion between the images, the plurality of textures into the frame memory into which the textures that form the joined image are written,
   wherein in the writing of the textures, a first texture among the plurality of textures is written into an area that is not in contact with an edge of the joined image frame,
   wherein, in the first rectangular pixel structure, the number of the pixels in the horizontal direction is larger than the number of the pixels in the perpendicular direction, wherein, in the second rectangular pixel structure, the number of the pixels in the perpendicular direction is larger than the number of the pixels in the horizontal direction, and wherein a total number of the pixels in the first rectangular pixel structure is the same as a total number of the pixels in the second rectangular pixel structure.

* * * * *